United States Patent Office 3,185,367
Patented May 25, 1965

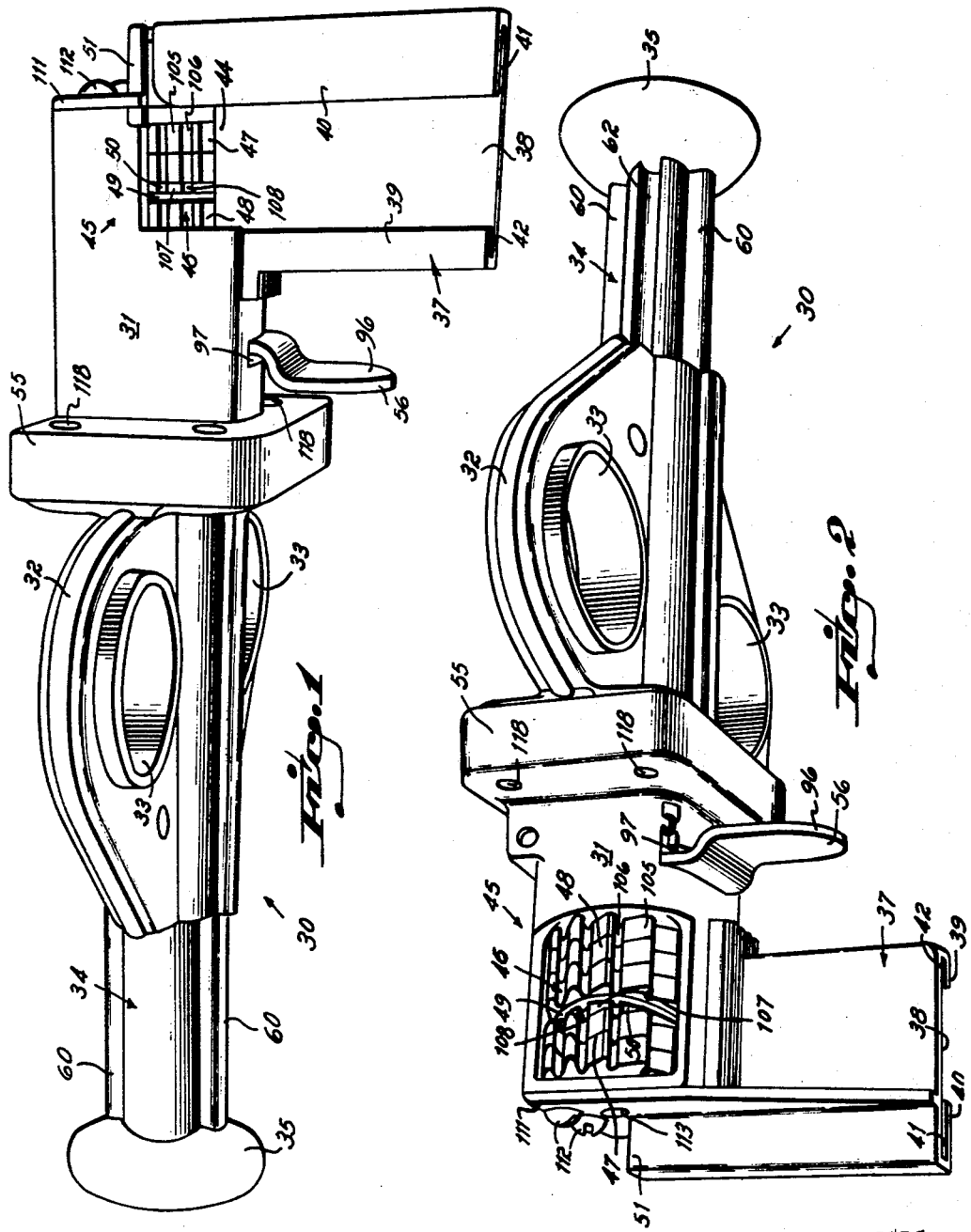

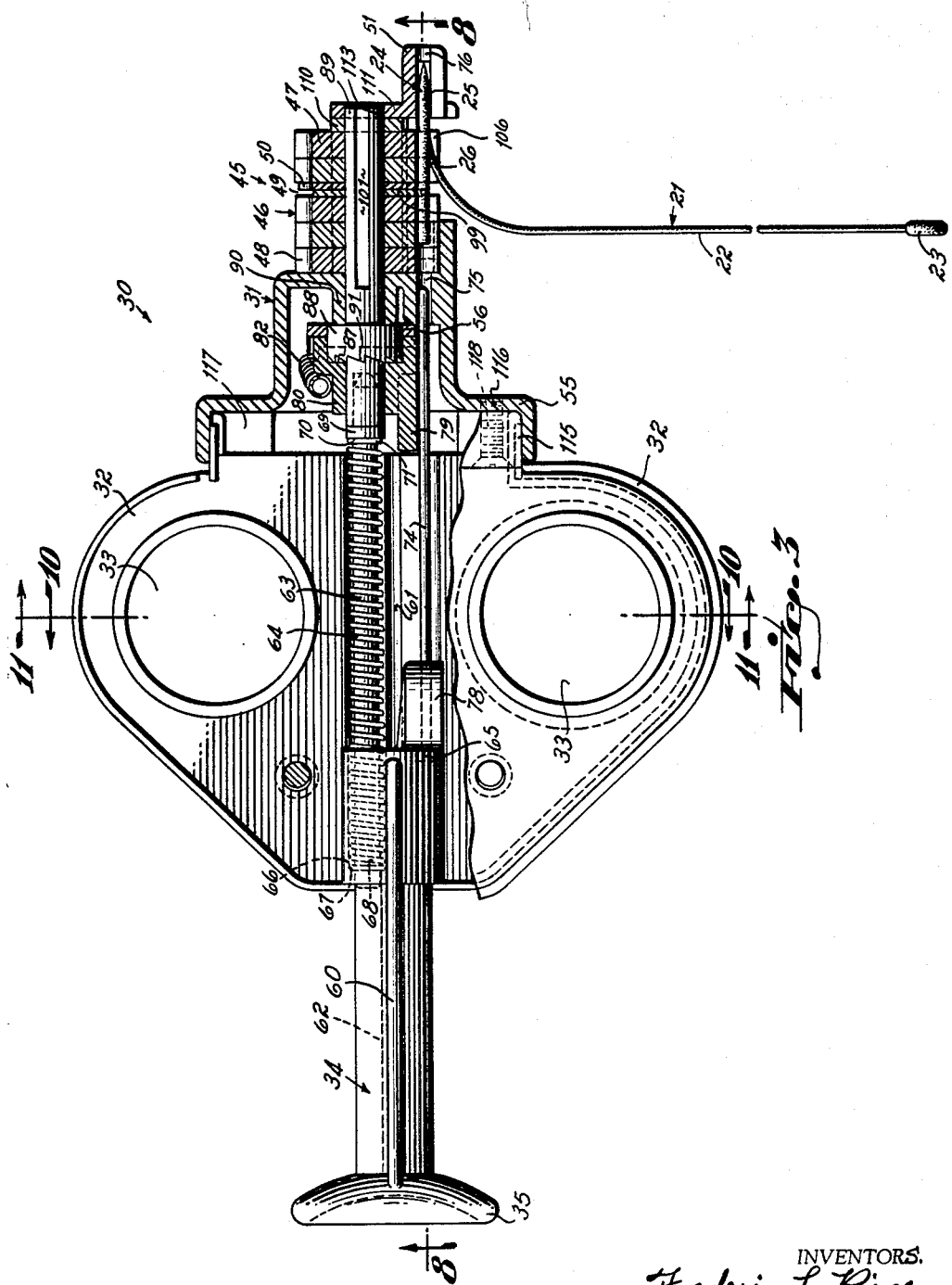

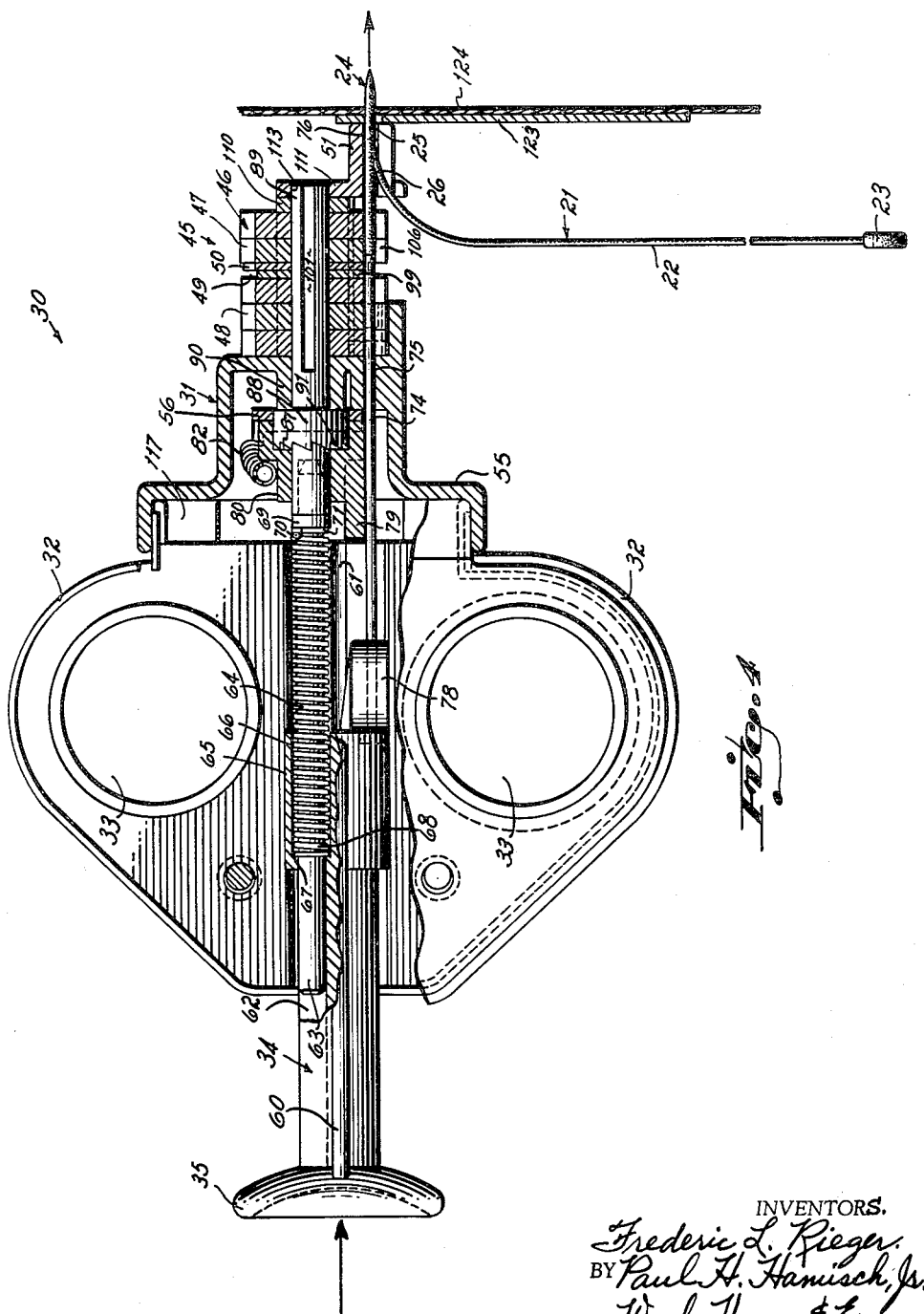

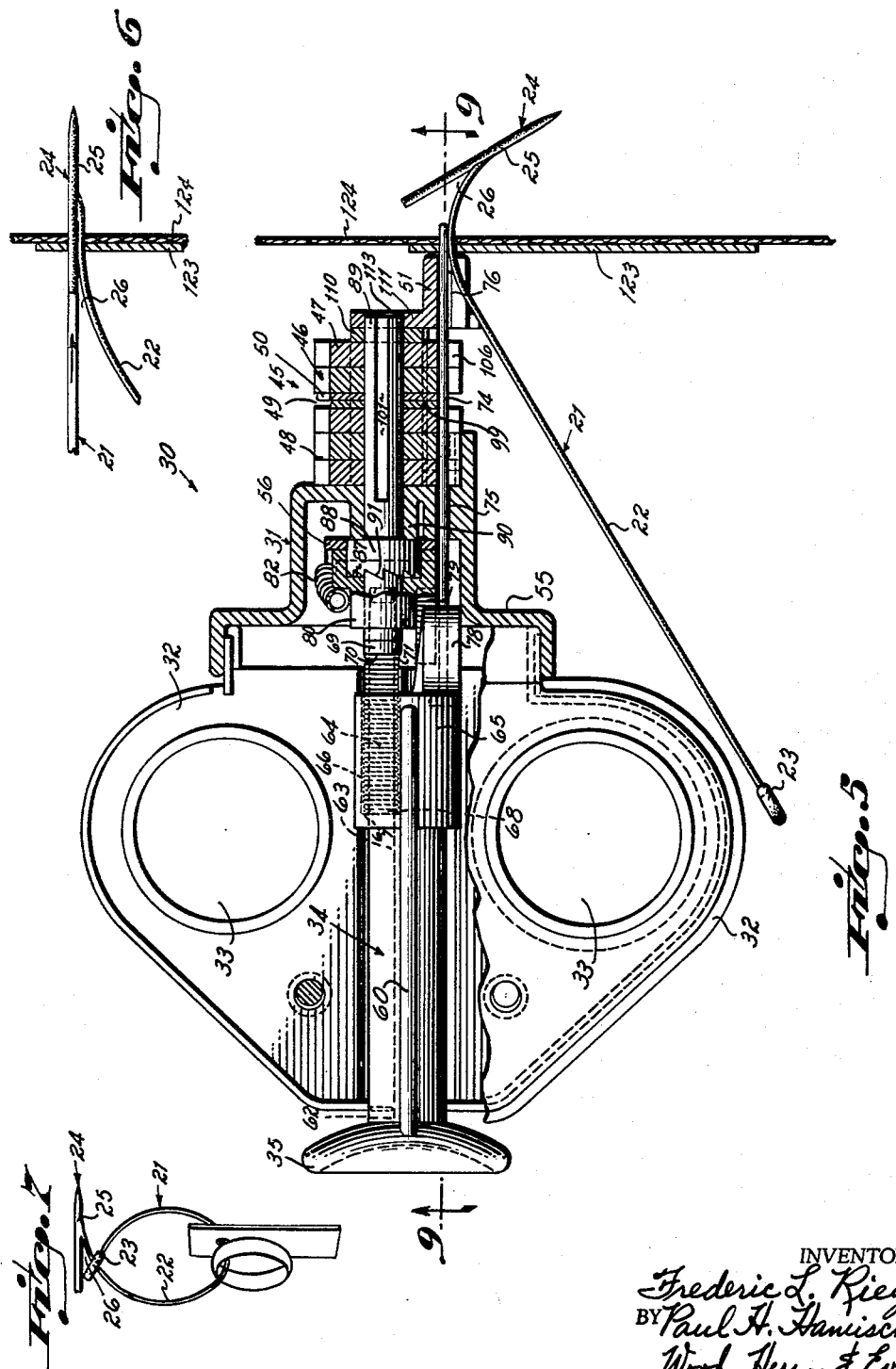

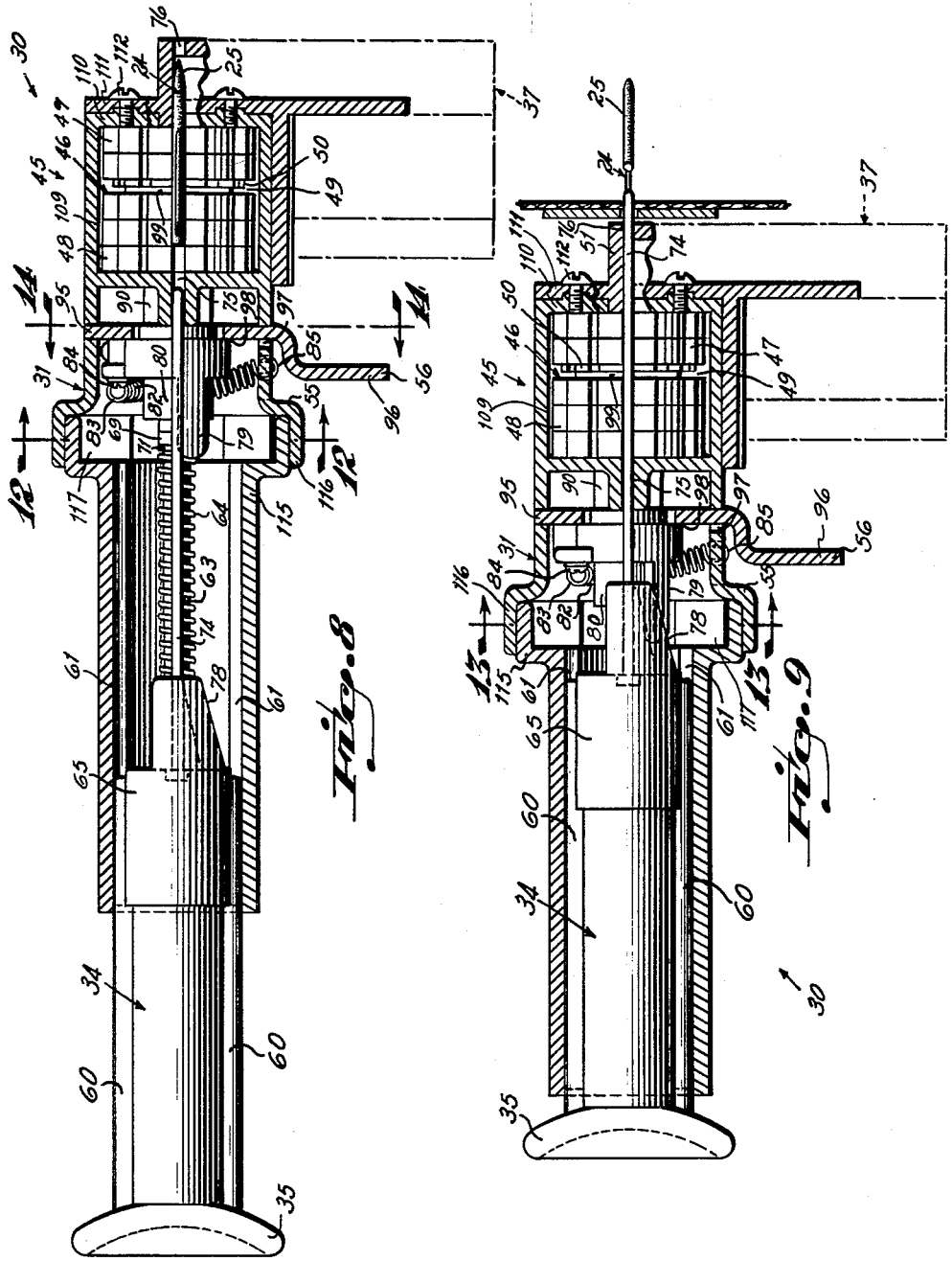

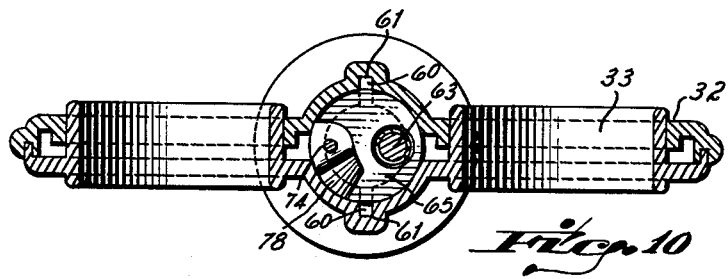
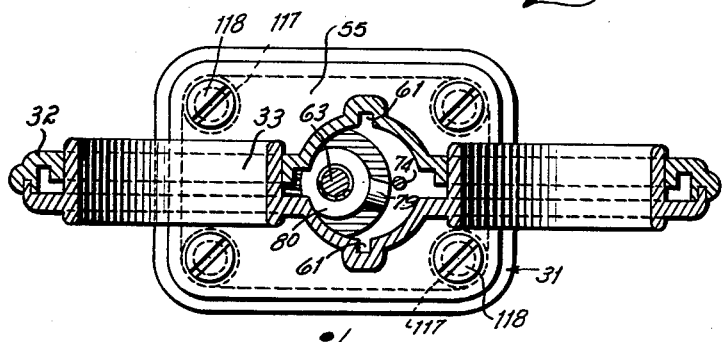
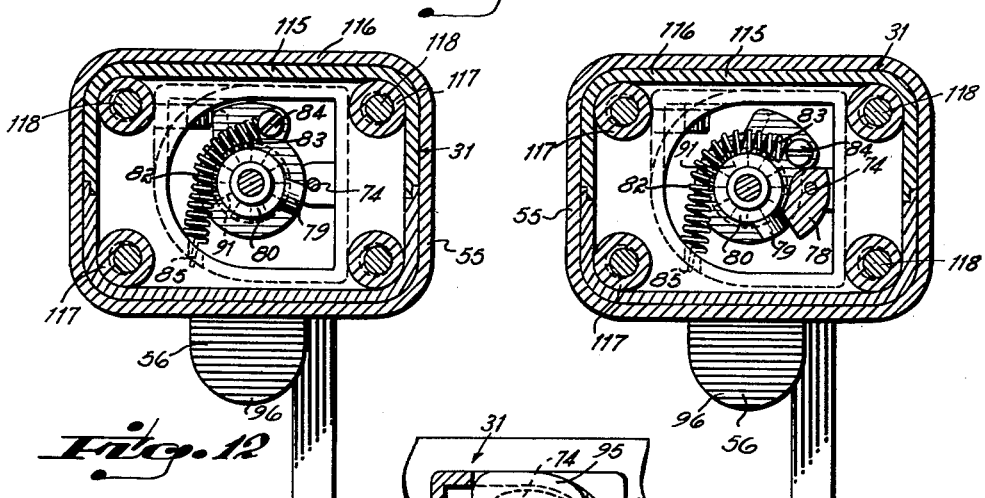
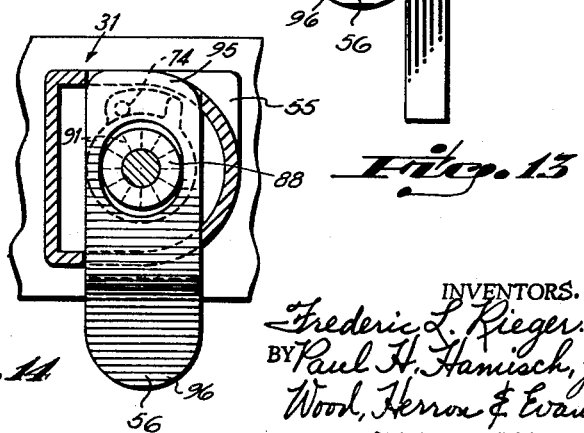

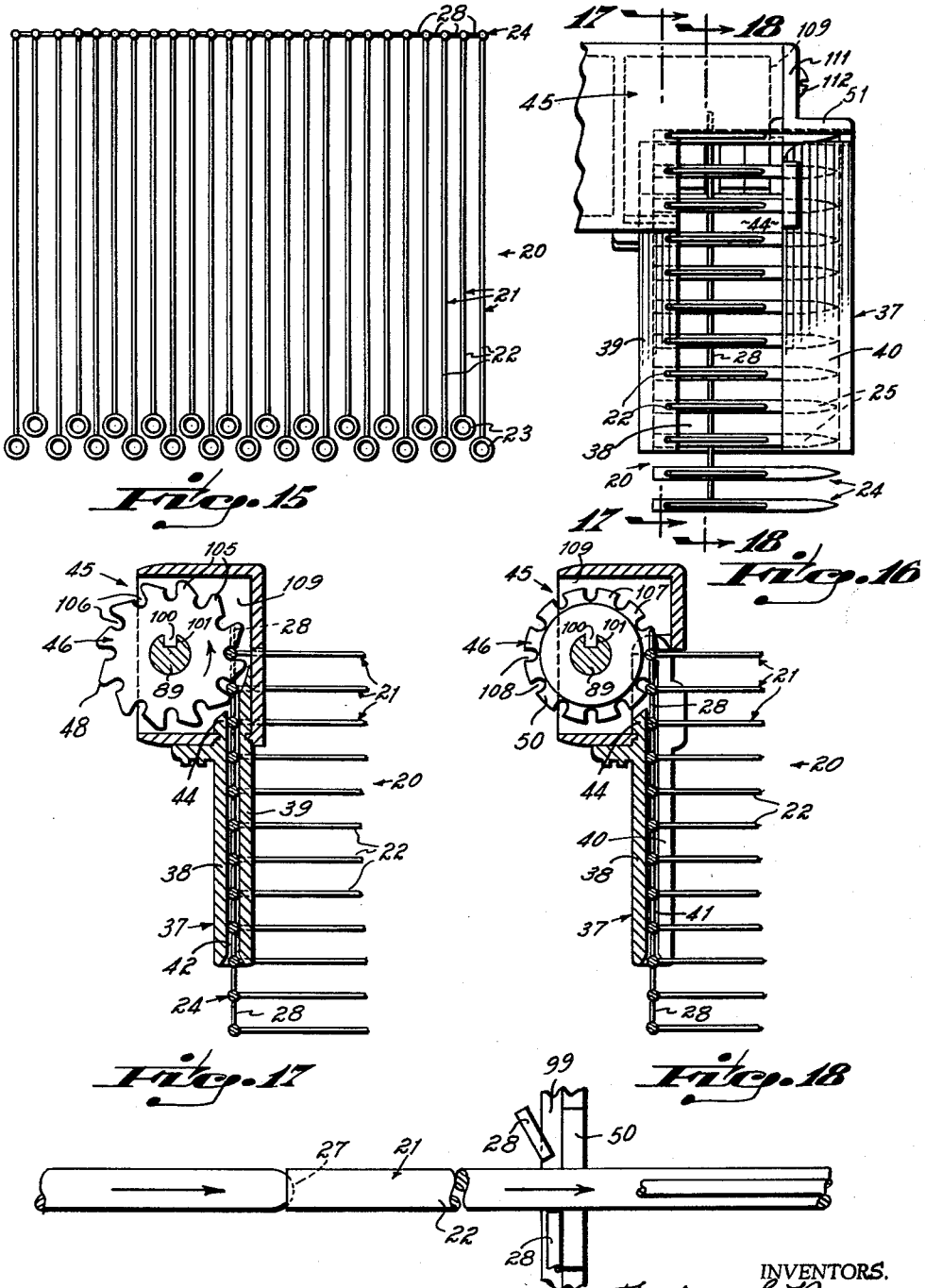

3,185,367
FASTENER GUN
Frederic L. Rieger, Dayton, and Paul H. Hamisch, Jr., Xenia, Ohio, assignors to The Monarch Marking System Company, Dayton, Ohio, a corporation of Ohio
Filed Jan. 30, 1963, Ser. No. 254,886
1 Claim. (Cl. 227—95)

This invention relates to a gun for applying fasteners which secure price tags and the like to objects of merchandise, and more particularly the invention is directed to a semi-automatic gun for ejecting fasteners, one at a time, from a belt of interconnected fasteners.

In co-pending application Serial No. 129,798, filed August 7, 1961, now abandoned, there is disclosed a fastener comprising a flexible strand having a barbed needle at one end and an eyelet at the other end through which the barb may pass to form a loop. The fastener can be used in one of two principal ways. In one, the barbed needle is passed through a hole in a hang tag and thereafter is inserted into a fabric. The eyelet secures the hang tag to the fastener and the barb holds the fastener in the fabric and prevents its inadvertent withdrawal. In fact, in most instances, the only practical way of removing the fastener is to sever the strand which connects the eyelet to the barbed needle.

Alternatively, the fastener can be formed as a loop by first passing the barbed needle through a tag and the object and then passing the needle through the eyelet, the engagement of the barb with the eyelet preventing the opening of the loop.

The objective of that invention is, in part, to provide a fastener which is easily applied but which can be removed only with difficulty and preferably only by destroying the fastener. It is used to provide assurance that a hang tag, once applied to an object, will remain applied to the object until it has been sold. Hang tags which have been applied in the past by a loop of string are susceptible of being easily removed and re-applied to other objects. It has been too easy for a person to remove a tag from one low-priced object and apply it to a similar, more expensive object and in this way obtain the expensive object at the lower price. A hang tag which can be removed only through difficulty and perhaps only by destroying the fastener is not subject to that manipulation by which unsuspecting salespeople and their employers can be cheated.

In the co-pending application referred to, only single fasteners are disclosed. The utility of the fastener could be greatly enhanced if a number of such fasteners could be loaded into an ejecting device and rapidly applied to the hang tags and merchandise. It has, therefore, been an objective of the invention to provide an assemblage of interconnected fasteners adapted to be loaded into an ejecting device and sequentially discharged from the device. In the preferred form of the invention, a series of fasteners are joined together in side-by-side relation to form a belt which can be loaded into an ejecting device.

It has been another objective of the invention to provide a gun-like ejecting device to receive a belt of interconnected fasteners, the device having means for sequentially ejecting individual fasteners and driving them into hang tags and objects of merchandise and having means for advancing fasteners, one at a time, into position for ejection.

It is a further objective of the invention to provide shearing means in association with the ejecting mechanism, the shearing means separating the individual fasteners from the connectors by which they are joined together in the form of a belt.

These and other objectives of the invention will become more readily apparent from the following detailed description taken in conjunction with the accompanying drawings in which:

FIG. 1 is a perspective view of an ejecting gun of the invention,

FIG. 2 is a perspective view of the gun of the invention taken from the side opposite that of FIG. 1, namely, the side into which the belt of fasteners is loaded, FIG. 3 is a top plan view partly in section showing the gun elements in position for ejection, FIG. 4 is a top plan view similar to FIG. 3 showing the gun elements in the process of ejecting a fastener, FIG. 5 is a view similar to FIG. 4 showing a fastener fully ejected, FIG. 6 is a fragmentary view partly in section showing a fastener passing through a tag in the fabric, FIG. 7 is a perspective view showing the manner of applying a fastener to an object other than a fabric, FIG. 8 is a cross-sectional view taken along lines 8—8 of FIG. 3, FIG. 9 is a cross-sectional view taken along lines 9—9 of FIG. 5, FIG. 10 is a cross-sectional view taken along lines 10—10 of FIG. 3, FIG. 11 is a cross-sectional view taken along lines 11—11 of FIG. 3, FIG. 12 is a cross-sectional view taken along lines 12—12 of FIG. 8, FIG. 13 is a cross-sectional view taken along lines 13—13 of FIG. 9, FIG. 14 is a cross-sectional view taken along lines 14—14 of FIG. 8, FIG. 15 is a top plan view of a belt of interconnected fasteners, FIG. 16 is a fragmentary side elevational view of the muzzle end of the ejector gun, FIG. 17 is a cross-sectional view taken along lines 17—17 of FIG. 16, FIG. 18 is a cross-sectional view taken along lines 18—18 of FIG. 16, and FIG. 19 is an enlarged fragmentary view showing the ejecting plunger driving a fastener past a shearing knife.

As indicated above, the invention is directed to a device for ejecting single fasteners from a belt fed into the device. Before describing the device, reference will be made first to the belt of fasteners. In FIGS. 15–19, there is shown a belt 20 of interconnected fasteners 21, each comprising a flexible strand 22 having an eyelet 23 at one end and a barbed needle 24 at the other end. The barbed needle has a pointed end 25 and a barb end 26. The barb end is recessed as indicated at 27 in FIG. 19 in order to receive the end of an ejector rod, to be described below. The adjacent fasteners are joined together by a single connector 28. In accordance with the preferred form of the invention, the belt of fasteners is constituted by a single integrally molded unit of a suitable plastic such as nylon. As shown in FIG. 15, the eyelets of adjacent fasteners are offset from each other to permit the molding of the belt as compactly as possible.

Turning now to FIGS. 1 and 2, there is shown a gun 30 into which a belt of fasteners is fed, each fastener being severed from its adjacent fastener and ejected singly from the gun into the fabric or other object to which it is to be attached. The gun comprises a casing 31 having a pair of finger grips 32 attached to its rearward end and having holes 33 into which fingers can be inserted to facilitate the manipulation of the gun. A plunger 34 projects from the rearward end of the casing and is slidably mounted in the casing. A thumb knob 35 is fixed to the end of the plunger so that an operator having his fingers in the holes 33 can operate the gun by pushing his thumb against the knob 35.

At the forward end of the gun is a magazine 37 in the form of a feed chute comprising a plate 38 having overhanging side flanges 39 and 40 which receive and confine the pointed end 25 of each needle and the barb 26 within channels 41 and 42 respectively formed between the plate and overhanging flanges. The magazine has an inner end 44 which is secured to the casing adjacent the breech 45 of the gun. Within the breech is an indexer 46 formed by a forward set of indexing or cog wheels 47 and a rearward set of indexing wheels 48. The wheels have a space 49 separating them to permit the passage of the fastener connectors 28 and to receive a knife wheel 50. Forward of the indexer is a muzzle 51 which is integral with the magazine 37 and through which the individual fasteners are discharged during the operation of the gun. Between the breech 45 and the finger grips 32 is a clutch housing 55 forming a part of the casing 31. Adjacent the clutch housing and projecting from the side of the casing is a clutch disengaging lever 56, whose operation will be described below.

Referring now to FIGS. 3, 4 and 5, the plunger 34 has a longitudinally extending narrow key 60 along each side, each key cooperating with a keyway (FIGS. 10 and 11) 61 in the casing 31 to maintain the plunger in proper alignment. The plunger has a longitudinal groove 62 which slidably receives a rod 63 which is surrounded by a plunger return spring 64. The forward end 65 of the plunger 34 has a bore 66 in axial alignment with the groove 62, the bore providing a shoulder 67 against which the rearward end 68 of the return spring bears. The forward end of the rod 63 is enlarged as at 69 to provide a shoulder 70 against which the opposite end 71 of the spring 64 bears. The return spring 64 is a compression spring which normally urges the plunger to the outward position illustrated in FIG. 3. The plunger is confined against complete removal in the outward direction by the walls of the casing 31.

The plunger has a drive rod 74 projecting from its forward end, the drive rod being slidable in a bore 75 at the forward end of the casing and through a bore 76 forming a part of the muzzle 51 of the gun.

The forward end of the plunger also has a curved surface forming a cam 78. The cam 78 is engageable with a cam follower 79 formed integrally with a driving clutch member 80. (See also FIGS. 10–13.) The driving clutch member is rotatably mounted with respect to the enlarged end 69 of the rod 63 and has a tension spring 82 fixed at one end 83 to it by means of a screw 84. The other end 85 of the tension spring 82 is fixed to the casing 31. The cam 78 and cam follower 79 cooperate in such a manner that the inward movement of the plunger causes the driving clutch member 80 to rotate clockwise from the position of FIG. 12 to the position of FIG. 13 against the action of the tension spring 82, thereby stressing the tension spring.

The driving clutch member 80 has a cup-shaped recess 87 at its forward end which receives a driven clutch member 88. A shaft 89 having a longitudinally extending narrow keyway is fixed to the driven clutch member 88 and is rotatably mounted in an annular collar 90 formed by the walls of the casing 31. One surface of the driven clutch member 88 is provided with teeth 91 which engage the bottom of the cup-shaped recess 87. The bottom of the cup-shaped recess may be provided with similar mating teeth which cooperate to permit the driving clutch member to move clockwise (as viewed in FIGS. 12 and 13) with respect to the driven clutch member during the "winding of the spring" but require the clutches to move together in the counterclockwise direction when the energy of spring 82 forces the driving clutch member to rotate in a counterclockwise direction.

As can be seen from FIGS. 8 and 9, the end 85 of the tension spring 82 is secured to the casing forwardly of the end 83 which is attached to the driving clutch member. The tension spring, therefore, not only acts as a wind-up spring for rotating the clutch, but also urges the driving clutch member into engagement with the driven clutch member. The clutch members can be held in a disengaged relation against the action of spring 82 by the lever 56 which is fixed at one end 95 in the casing 31 and has its free end 96 passing through a slot 97 in the casing sufficiently wide to permit a slight swinging movement of the lever. One surface 98 of the lever bears against the driving clutch member and forces the driving clutch member rearwardly (toward the left, as viewed in FIGS. 3–5 and 8 and 9) to effect the disengagement of the driving clutch member from the driven clutch member.

The indexing wheels 47 and 48, the shearing knife 50 and a spacer 99 are fixed on the shaft 89 by means of keys 100 (FIGS. 17 and 18) which project into a keyway 101 in the shaft 89.

As shown in FIG. 17, the indexing wheels 47 and 48 have teeth 105 providing recesses 106 between adjoining bases of adjacent teeth, the recesses being semi-circular to receive the cylindrically shaped barbed needles 24. The shearing knife 50 (FIG. 18) also has teeth 107, the teeth 107 being spaced to form recesses 108 through which the needles 24 pass. The space between adjoining teeth of the knife 50 is just slightly greater than the diameter of the needles 24 so that, when the needles slide longitudinally with respect to the teeth, the connectors 28 between adjoining needles will be sheared from the longitudinally moving needle. The shearing knife 50 is preferably made of a high carbon steel or an alloy having the characteristic hardness found in cutting tools. One of the indexing wheels 47 could, of course, be made of such a hard cutting metal, but for economical reasons, it is preferred to employ expensive tool steel or alloys only in a separate, replaceable element as the shearing knife.

The wheels 47 and 48 and the knife 50 are confined within a generally rectangular chamber 109 formed by the casing. The chamber 109 has a front wall 110 which is engaged by the forward surface of indexing wheels 47. The element forming magazine 37 and muzzle 51 has a flange 111 which is mounted on the front wall 110 by screws 112 and has a hole 113 through which shaft 89 projects to form a partial bearing for the shaft.

As can be seen from FIGS. 8 and 9, the casing 31 is in two parts, 115 and 116, the rearward part 115 providing a tube into which the plunger 34 is slidable. The rearward end of the casing part 116 is enlarged to form a socket into which the casing part 115 is inserted. The inserted portion of casing part 115 has four integrally threaded bosses 117 at its corners into which screws 118 are threaded. The screws 118 secure the part 116 to the part 115.

To disassemble the gun for replacement of the indexing wheels 47 and 48 or the knife 50, the screws 118 which hold the casing parts 115 and 116 together are removed, permitting the casing part 116 to be withdrawn from part 115. The shaft 89 and the clutch members 80 and 88 can be slid rearwardly, thereby withdrawing the shaft from the indexing wheels and the knife. The indexing wheels are then free to drop out of the chamber 109 for inspection and replacement.

In the operation of the gun, a belt of fasteners is inserted in the magazine until the innermost needle engages one of the teeth of the indexing wheels 47 and 48. One operation and release of the plunger will bring a needle into alignment with the drive rod 74. When the plunger is subsequently depressed, the rod 74 is brought into engagement with the recess 27 at the rearward end of the needle disposed in the breech. Continued forward movement of the plunger drives the needle from the muzzle until, as shown in FIGS. 4 and 5, the needle passes completely through a tag indicated at 123 and a fabric 124. The barb will prevent the return of the needle through the tag and the fabric.

As the needle moves with respect to the knife 50, the connector 28 on each side is sheared from the needle, leaving the surface of the needle as smooth as possible. As the plunger nears the forward end of its stroke, the cam 78 engages the cam follower 79 on the driving clutch member 80 and rotates the driving clutch member clockwise from the position of FIG. 12 to the position of FIG. 13, thereby increasing the tension of the spring 82. Because of the direction of the clutch teeth 91, and because the drive rod 74 is disposed between adjoining teeth of the indexing wheels, the driven clutch member 88 is fixed against rotation, and thus the driving clutch member 80 can be rotated with respect to the driven clutch member.

When thumb pressure on the plunger is released, the spring 64 drives the plunger rearwardly to the position of FIG. 3. Near the end of the rearward stroke of the plunger, the drive rod 74 is withdrawn from engagement with the indexing wheels 47 and 48 so that they are free to rotate. The spring 82 causes the driving clutch member 80 to return in a counterclockwise direction, as viewed in FIGS. 12 and 13, to its original position, carrying with it, through its engagement with teeth 91, the driven clutch member 88, shaft 89 and indexing wheels 47 and 48. The indexing wheels, during counterclockwise movement, bring the next succeeding needle into position.

The operation of the invention has been described with particular reference to the affixing of a tag to a fabric wherein the tag is held to the fabric by the engagement of the barb with the fabric on the one hand, and the eyelet preventing the removal of the tag from the fastener. As illustrated in FIG. 7, the invention admits of securing tags to objects other than fabrics. These would include a ring, as illustrated, drawer handles, and the like. When the gun is used to apply tags to such objects, the simplest operation is to pass the eyelet through the object and hold it against the muzzle of the gun. The ejection of the barbed end of the fastener will cause the needle and its barb to pass through the eyelet. When through the eyelet, the barb and connecting strand will, through the resilience of their connection, spread apart and secure the fastener to the object in the form of a loop.

If it is desired to unload the gun after only a portion of the fasteners in a belt has been discharged, clutch disengaging lever 56 is pulled rearwardly to move driving clutch member 80 out of engagement with driven clutch member 88, leaving the driven member and the indexing wheels free to rotate. When this condition is attained, the belt may be pulled from the magazine 38.

We claim:

A gun for applying fasteners which are joined together, side by side, by a connector, said gun comprising,
   a casing having a muzzle at one end,
   a plunger slidably mounted in said casing, said plunger having a drive rod at one end thereof which is engageable with a fastener and projectable from the muzzle of said gun,
   means supporting a belt of fasteners for movement into said gun between said rod and said muzzle,
   a pair of longitudinally spaced toothed indexing wheels rotatably mounted on said casing between said rod and said muzzle, the teeth of said wheels engaging said fasteners with said connectors passing in the space between adjacent wheels,
   a knife disposed in the space between said wheels contiguous with said wheel nearer the muzzle end of said gun, and
   actuator means connected between said plunger and said wheels for rotating said wheels upon return of said plunger from a projected position to advance a fastener into position for engagement by said rod.

References Cited by the Examiner
UNITED STATES PATENTS

| | | | |
|---|---|---|---|
| 349,387 | 9/86 | Ethridge | 1—46 |
| 394,604 | 12/88 | Patten | 1—46 |
| 473,873 | 4/92 | Godfrey | 1—46 |
| 2,923,937 | 2/60 | Laucher | 1—56 X |
| 2,952,851 | 9/60 | Epstein | 1—46 |

GRANVILLE Y. CUSTER, Jr., *Primary Examiner.*